G. J. GILMORE.
LENS SHIELD FOR MOVING PICTURE MACHINES.
APPLICATION FILED DEC. 30, 1908.
925,326.
Patented June 15, 1909.
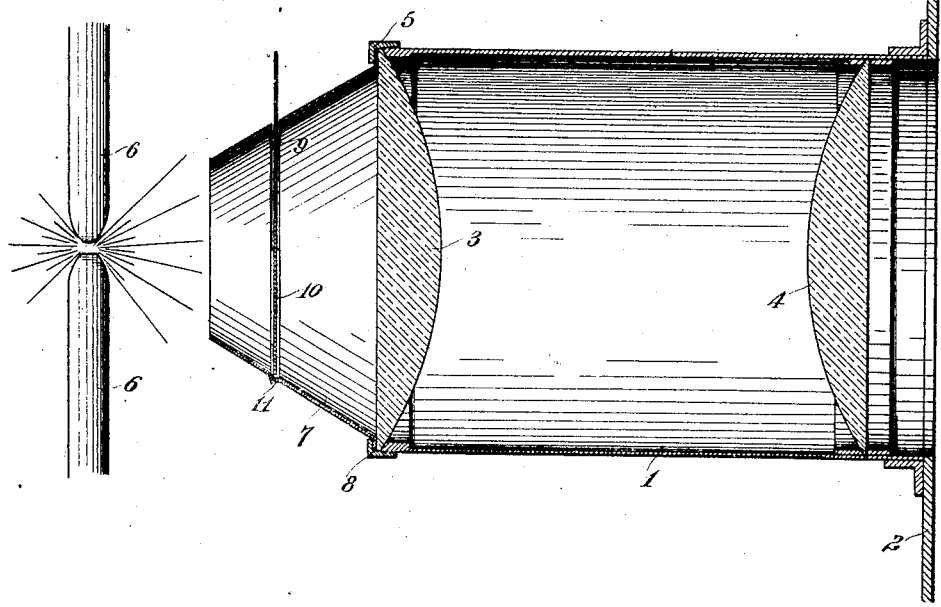
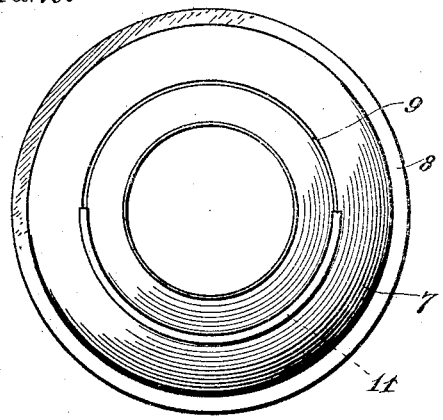
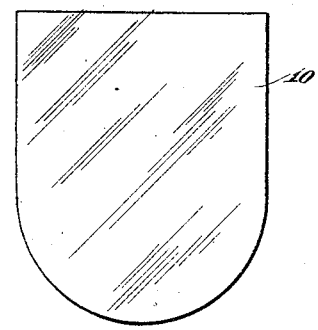
Inventor:
George J. Gilmore

UNITED STATES PATENT OFFICE.

GEORGE J. GILMORE, OF CHICAGO, ILLINOIS.

LENS-SHIELD FOR MOVING-PICTURE MACHINES.

No. 925,326.  Specification of Letters Patent.  Patented June 15, 1909.

Application filed December 30, 1908. Serial No. 470,072.

*To all whom it may concern:*

Be it known that I, GEORGE J. GILMORE, a citizen of the United States, residing at Chicago, county of Cook, and State of Illinois, have invented certain new and useful Improvements in Lens-Shields for Moving-Picture Machines, of which the following is a specification.

My invention relates to moving picture machines, and more specifically to the lenses embodied therein.

The object of my invention is to provide a protection for the innermost lens, that is the one positioned adjacent to the source of light in the machine, against the intense heat to which it is at the present time, in the ordinary moving picture machine subjected, because of its close proximity to the heat radiating source of light. Because of the comparatively great thickness of the lenses used in such machines, the surfaces of the lens positioned adjacent to the light source, are subjected to different temperatures, the innermost surface being subjected to a very high temperature because of the intense heat radiated from the light source, whereas the outer surface thereof is exposed only to the ordinary atmospheric temperature. Because of such existing conditions the innermost lens not infrequently cracks or breaks, in which event the lens becomes useless, it having to be replaced by a new one, obviously resulting in a financial loss, as well as a loss of time and labor, the replacing of a broken lens being, as is known especially to those with knowledge of the manipulation of the moving picture machine, a laborious and an awkward undertaking.

It is therefore my object to eliminate the possibility of such occurrence by the provision of means adapted to be interposed between the light source and the innermost lens, which will act in the capacity of a protector or shield therefor.

A still further object of my invention is to provide a shield of the character mentioned which will be of simple construction, hence of low cost to manufacture.

Other objects will appear hereinafter.

With these objects in view my invention consists in a shield characterized as above mentioned and in certain details of construction and arrangement of parts all as will be hereinafter fully described and particularly pointed out in the claims.

My invention will be more readily understood by reference to the accompanying drawings forming a part of this specification, and in which, Figure 1 is a cross sectional view of a moving picture machine lens holder or tube, the lens, adjacent to the carbons, there shown, being provided with the preferred form of my shield. Fig. 2 is a front elevation of the body of my shield, and Fig. 3 is a plan view of the transparent sheet used in connection with the body shown in Fig. 2.

Referring now to the drawings 1 indicates the ordinary lens holder or tube of a moving picture machine, a portion of the rear wall 2 of the latter being shown in Fig. 1. Supported in said lens holder 1 are ordinary lenses 3 and 4, the former being detachably secured, as is usual, by means of a flanged ring 5 threaded upon the rearward extremity of the holder, the lens 4 being, as is usual, fixedly secured.

6 indicates the ordinary carbons of an arc lamp, the latter being the ordinary means used in a machine of this character to produce an incandescent light.

It is the lens 3, that as before described, is not infrequently broken, because of the heat radiated by the arc lamp. To protect said lens I provide preferably a sheet metal tubular member 7, preferably truncated conical in shape, the same being provided at its extremity of largest circumference, with a circumferential outwardly extending flange 8, the outer diameter of which is substantially the same as the diameter of the lens 3. Said flanged extremity of the member 7 is adapted to rest upon the plane or flat surface of the lens 3, the flange thereof being adapted to be engaged by the flange ring 5, the latter thereby obviously acting as a means of holding the same as well as the lens 3 in position. The upper half of said member 7 is provided with a narrow slot 9 intermediate the extremities thereof, said slot being adapted to receive a transparent sheet 10, so as to support the same in a plate perpendicular to the axis of the member 7 and hence the lens holder 1. Said sheet 10 may be formed of any suitable transparent material, glass or mica being however preferably used. The lower edge of said sheet is semi-circularly formed, as shown in Fig. 3, so as to conform to the shape of the lower portion of the member 7 upon which it rests, said lower portion of said member 7 being preferably provided with a channel 11 adapted to receive and to form a seat for the reception of said lower edge of said sheet. Said sheet is thereby removably held in the member 7, hence may obviously be readily and easily removed or replaced when necessary. By the provision of a shield of such construction it is obvious that the lens will be thoroughly protected from the heat radiated from the light source, hence will obviate the possibility of the before mentioned occurrences, the efficiency of the machine, being by such provision, greatly enhanced. However, though I have shown the shield body of a truncated conical shape, I do not wish to be limited thereto, as the same might be of any other suitable shape or design without departing from the spirit of my invention, and further though I have shown a simple and efficient means for supporting the transparent sheet, any other suitable means of supporting the same might be employed if desired.

Having described my invention what I claim as new and desire to secure by Letters Patent is:

1. In a moving picture machine, a tubular lens holder, a rear lens mounted in said holder, a ring threaded on the rear end of said holder and having an inturned flange to hold said lens in position, in combination with a sheet metal tubular member having a flange interposed between said inturned flange and the lens, and a sheet of transparent material arranged in said tubular member and extending transversely of the same, substantially as described.

2. In a moving picture machine, a tubular lens holder, a rear lens mounted in said holder, a ring threaded on the rear end of said holder and having an inturned flange to hold said lens in position in combination with a sheet metal tubular member having a flange at one end interposed between said inturned flange and said lens, said tubular member being provided with a slot in its upper face and a corresponding semicircumferential seat in its lower face, and a transparent member extending through said slot and resting on said seat, substantially as described.

In testimony whereof I have signed my name to this specification in the presence of two subscribing witnesses.

GEORGE J. GILMORE.

Witnesses:
JOSHUA R. H. POTTS,
HELEN F. LILLIS.